UNITED STATES PATENT OFFICE.

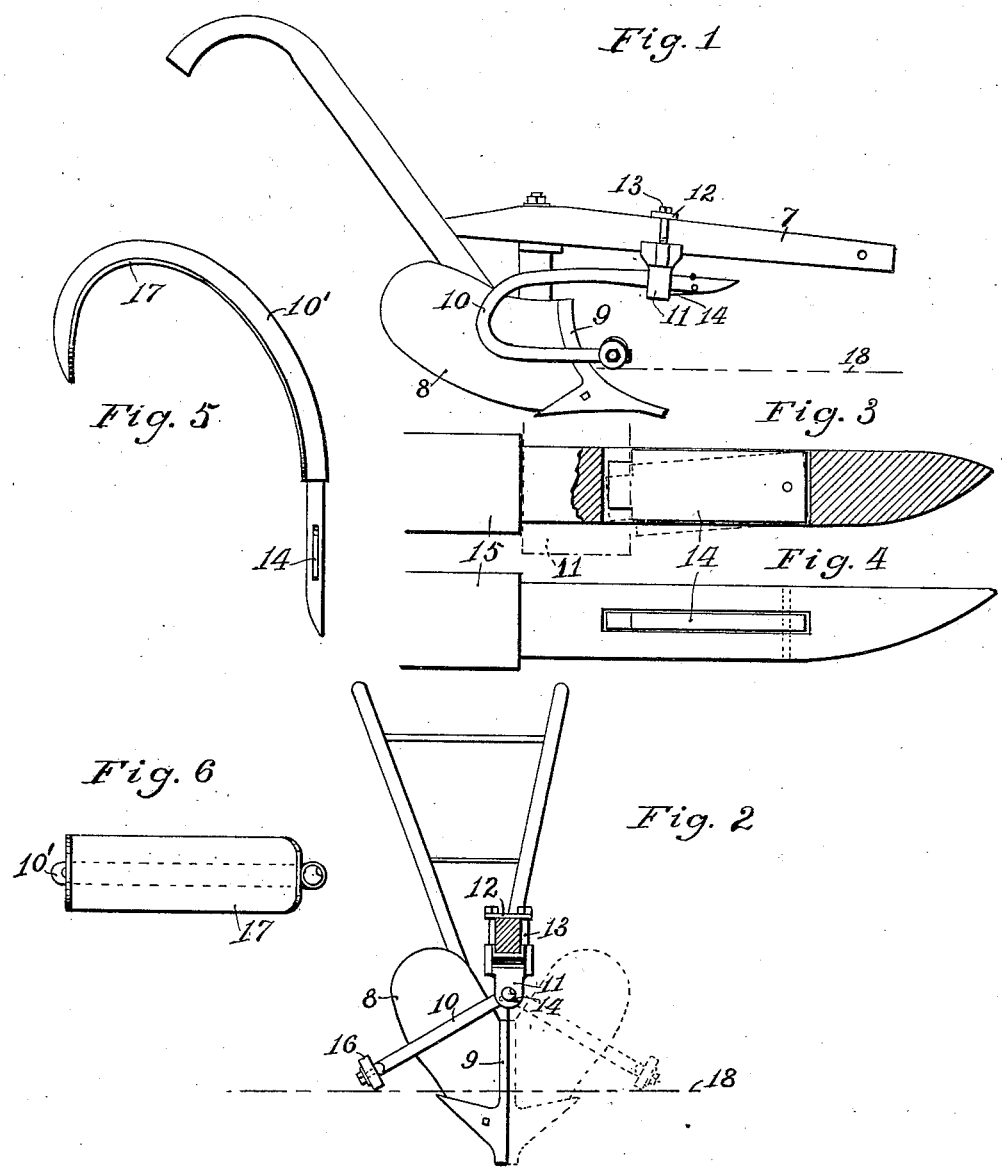

CHARLES FREDRICK MOORE, OF GILLETT, PENNSYLVANIA.

WEED-FOLDER.

No. 921,266.     Specification of Letters Patent.     Patented May 11, 1909.

Application filed December 26, 1908. Serial No. 469,506.

*To all whom it may concern:*

Be it known that I, CHARLES FREDRICK MOORE, a citizen of the United States, residing at Gillett, in the county of Bradford and State of Pennsylvania, have invented a new and useful Improvement in Weed-Folders, of which the following is a specification.

This invention relates to a device for attachment to a plow whereby to assist in plowing under weeds, fertilizing crops, stubble or coarse litter.

To this end, therefore, the invention consists in the formation, construction and combination of parts for the purpose specified substantially as and in the manner hereinafter set forth and claimed.

To make the disclosure of this invention full and clear reference will be had to the accompanying sheet of drawings, which form a part of the specification and in which—

Figure 1 shows in side elevation a plow with the improvement applied thereto; Fig. 2 illustrates the same in front elevation (the beam being shown in section) and indicates also in dotted lines the application of the attachment to a left-hand plow; Figs. 3 and 4 show, on an enlarged scale, longitudinal section and plan view respectively, a preferred form of structure whereby the weed folder is made readily attachable and detachable; and Figs. 5 and 6 show in plan view and side elevation, respectively, a modified form of the attachment.

To insure the folding over and, therefore, the complete covering up or burial of weeds or other growth or coarse litter, when plowing, it is essential that as a furrow-slice is being turned by the plow, the weeds or other material thereon and particularly that at the freshly cut, or inner, edge of the furrow-slice be caught by the folding attachment and brought down in a manner such that it will fall entirely under and be wholly covered in the furrow as the plow moves along.

Another object of the invention is to so construct and mount the said attachment that it will work equally well on a right-hand plow, on a left-hand plow and on a side-hill plow. Incidental to this universal adaptability is a special structure providing for the ready removal and re-attachment of the device.

Referring to the drawings 7 indicates the plow beam, 8 the mold-board, and 9 the vertical cutting edge of the plow. These parts typify those of any ordinary plow.

As indicated above, it is essential that the weed folder, represented at 10, and 10' gather in all material on the furrow-slice being turned, therefore, it is necessary that the forward end of the weed folder be mounted in the plane passing through the vertical cutting edge of the plow. This vertical cutting edge 9 is that formed in the present instance by the upright cutting edge of the plowshare, which in the drawing is provided with a colter extension. In those plows where a knife colter is attached to the beam, it with the land-side edge of the plowshare, will determine the vertical cutting plane of the plow.

The weed folder may be shaped or curved into any form that will best adapt it for folding down grain, clover, or weeds, standing on the furrow slice being turned, whereby such growth shall be completely covered in the furrow by said turned furrow slice. Said weed folder may also have such shape or form as will at the same time adapt it for scraping coarse manure or other litter from the surface, of the furrow slice being turned, into the furrow, to be covered by the furrow slice when turned.

The hinging of the weed folder may be accomplished in various ways, one of which is fully illustrated in the drawings. For this purpose a cylindrical socket is provided preferably at the underside of the plow beam with its axis in said vertical plane. This socket may be provided upon the beam of any plow in any suitable manner whatever the form or material of the beam may be. In the drawings said socket is shown as formed in a clip, indicated at 11, which clip is secured to the plow beam by means of the plate 12 and bolts 13, which preferably turn into screw-threaded lugs on the sides of the clip 11. Obviously a clip of this sort may be longitudinally adjusted upon the plow beam as desired. The forward end of the weed folder is shouldered and the tip pointed, as especially indicated in Figs. 3 and 4, and forward of this shoulder an automatic latch, as 14, is pivoted in a slot extending through the forward end of the weed folder. This latch is reduced at its swinging end so as to provide a shoulder which shall engage the side of the clip 11 opposite to the shoulder 15 on the weed folder. The extension of the latch 14 beyond the shoulder of the latch engages the wall of the socket and so prevents the latch from falling farther from the slot than is necessary to hold the folder in the socket. By providing the latch with a squared forward end and pivoting it near the forward wall of its slot, the latch is prevented from protruding but a portion of its width beyond the cylindrical surface of the weed folder, even when off the plow. This not only renders the latch less liable to injury, but also makes easier the insertion of the folder within the socket 11, since it cannot, in any position of the folder, stand out more than at a slight angle thereto and, therefore, will readily recede into its slot when the folder is put in place. When the folder has been put in place the latch then falls by gravity to the position indicated by dotted lines in Fig. 3 and prevents the withdrawal of the folder until the latch has been pushed back into its slot by hand.

By providing the above described means for attachment of the folder to a plow it is clear that said folder may be readily detached and also that it may be shifted from a right-hand plow to a left-hand plow, as indicated in Fig. 2, and as readily shifted from one side to the other on a side-hill plow. Fig. 2 serves also to illustrate the use of the weed folder in this manner upon a side-hill plow. If desirable the outer end of the weed folder may be equipped with a small wheel, as indicated at 16, to insure the free movement of said end over the surface of the ground, which is indicated by the broken line 18.

The folder may be made of a single bar, as illustrated in Figs. 1 and 2, and in this form it is well adapted for the folding of weeds, stubble or fertilizing crops, such as rye or clover, but where it is desired to scrape into the furrow litter such as straw or coarse manure, the folder may be provided with a web or double flange preferably attached thereto along its inner curve, as indicated at 17, Figs. 5 and 6.

The invention claimed is:—

1. The combination with a plow, of a weed folder constructed for attachment thereto and means for hinging the weed folder to the plow in the plane through the vertical cutting edge of the plow, so that the weed folder may operate at either side of said plane in the manner and for the purpose specified.

2. The combination with a plow having a beam provided with a socket at the underside of said beam, the longitudinal axis of which socket is in the plane through the vertical cutting edge of the plow, of a weed folder provided with a journal portion constructed to fit and turn in said socket as on a hinge so that it may operate at either side of the beam, substantially as and for the purpose set forth.

3. The combination with a plow provided with a socket on the beam thereof, of a weed folder having its forward end fitted to said socket, and an automatic latch in the said forward end for holding the weed folder detachably in said socket.

4. The combination with a socket of a shouldered part for insertion therein, and a latch pivoted in a slot in said part forward of the shoulder and adapted to fall by gravity through either side of the slot and to engage with its end the side of the socket opposite to that engaged by said shoulder.

CHARLES FREDRICK MOORE.

Witnesses:
 STEPHEN H. HEYWOOD,
 JAMES C. ROBINSON.